United States Patent
Ando

(10) Patent No.: US 9,734,716 B2
(45) Date of Patent: Aug. 15, 2017

(54) DRIVING SUPPORT DEVICE

(71) Applicant: DENSO CORPORATION, Kariya, Aichi-pref. (JP)

(72) Inventor: Motonori Ando, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/856,303

(22) Filed: Sep. 16, 2015

(65) Prior Publication Data

US 2016/0086490 A1    Mar. 24, 2016

(30) Foreign Application Priority Data

Sep. 18, 2014  (JP) ................................ 2014-190112

(51) Int. Cl.
| | |
|---|---|
| *G08G 1/00* | (2006.01) |
| *B60W 30/00* | (2006.01) |
| *B60W 30/08* | (2012.01) |
| *G08G 1/16* | (2006.01) |

(52) U.S. Cl.
CPC ............ *G08G 1/166* (2013.01); *B60W 30/08* (2013.01); *G08G 1/163* (2013.01)

(58) Field of Classification Search
CPC combination set(s) only.
See application file for complete search history.

(56) References Cited

U.S. PATENT DOCUMENTS

| | | |
|---|---|---|
| 2002/0135467 A1 | 9/2002 | Koike |
| 2003/0006889 A1 | 1/2003 | Koike |
| 2003/0009275 A1 | 1/2003 | Koike |
| 2012/0161951 A1* | 6/2012 | Ito .......................... B60Q 9/008 340/435 |

FOREIGN PATENT DOCUMENTS

| | | |
|---|---|---|
| JP | 2006-182207 A | 7/2006 |
| JP | 2008-97413 A | 4/2008 |

* cited by examiner

*Primary Examiner* — Yonel Beaulieu
(74) *Attorney, Agent, or Firm* — Knobbe, Martens, Olson & Bear, LLP

(57) ABSTRACT

A driving support device includes: a first vehicular information obtaining device that obtains a position and a moving direction of a first vehicle; a second vehicular information obtaining device that obtains a position and a moving direction of a second vehicle via a wireless communication with the second vehicle; a route intersection obtaining device that obtains an intersection between a predicted moving route of the first vehicle and a predicted moving route of the second vehicle; an end point obtaining device that obtains an end point of a unit road on a moving destination side of the first vehicle; a support determining device that determines a driving support content for a driver of the first vehicle, according to a distance between the intersection and the end point; and a warning device that warns the driver of the first vehicle according to the driving support content.

20 Claims, 6 Drawing Sheets

DRIVING SUPPORT DEVICE

CROSS REFERENCE TO RELATED APPLICATION

This application is based on Japanese Patent Application No. 2014-190112 filed on Sep. 18, 2014, the disclosure of which is incorporated herein by reference.

TECHNICAL FIELD

The present disclosure relates to a driving support device for supporting a driving operation of a driver.

BACKGROUND

Conventionally, JP-2008-97413 A teaches a technique such that information about a prediction vehicle position of another vehicle and a road on which the other vehicle is driving is obtained via a wireless communication with the other vehicle, and a collision possibility on the other vehicle is calculated. In this technique, when an altitude of the road on which the other vehicle is running is different from an altitude of the road on which the subject vehicle is running, it is determined that there is no collision possibility since an intersection of two roads is a grade separated crossing.

However, in the technique described in JP-2008-97413 A, it is necessary to obtain a large amount of information from the other vehicle to the subject vehicle via the wireless communication such as a prediction vehicle position of the other vehicle and the road on which the other vehicle is travelling. Accordingly, a size of data transmitting and receiving between the subject vehicle and the other vehicle becomes large. Further, it is required for the other vehicle to be capable of transmitting the large amount of information. Thus, if the other vehicle cannot transmit the large amount of information, the above function does not work sufficiently.

SUMMARY

It is an object of the present disclosure to provide a driving support device for executing a driving support according to a condition of a road even if amount of information obtained from other vehicles is small.

According to a driving support device includes: a first vehicular information obtaining device that obtains a position and a moving direction of a first vehicle; a second vehicular information obtaining device that obtains a position and a moving direction of a second vehicle via a wireless communication with the second vehicle; a route intersection obtaining device that obtains an intersection between a predicted moving route of the first vehicle, which is calculated based on the position and the moving direction of the first vehicle, and a predicted moving route of the second vehicle, which is calculated based on the position and the moving direction of the second vehicle; an end point obtaining device that obtains an end point of a unit road on a moving destination side of the first vehicle while travelling along the unit road, according to the position and the moving direction of the first vehicle; a support determining device that determines a driving support content for a driver of the first vehicle, according to a distance between the intersection and the end point; and a warning device that warns the driver of the first vehicle according to the driving support content.

In the above driving support device, the support determining device determines a driving support content for a driver of the first vehicle, according to a distance between the intersection and the end point. Here, the distance between the intersection and the end point is changed according to a feature of the end point such as a cross road, a grade separation, a junction, and a merging point. Thus, the driving support device executes the driving support operation according to the feature of the end point such as the intersection point even if the amount of information obtained from the other vehicle is small.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)
(1-1. Construction)

Figure 1:
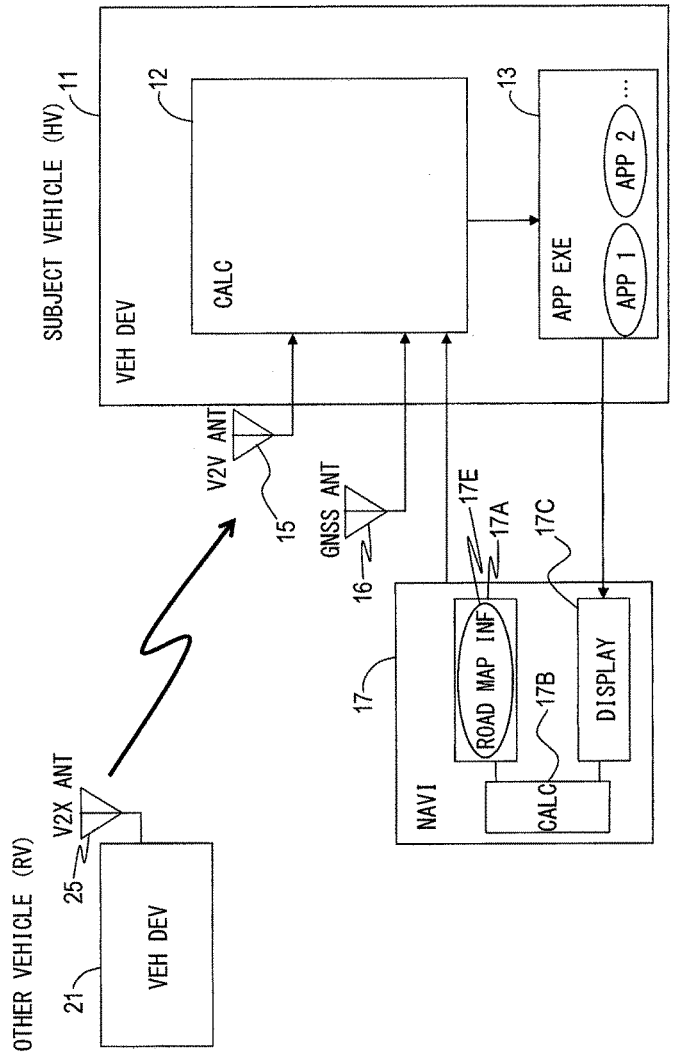
FIG. 1 is a block diagram showing a driving support device according to a first embodiment.

A driving support device shown in FIG. 1 mainly includes a vehicular device 11 mounted on a subject vehicle HV. The vehicular device 11 includes a calculation unit 12 and an application execution unit 13. The driving support device further includes a V2V antenna 15, a GNSS antenna 16 and a navigation device 17. Here, V2V means a vehicle to vehicle communication, and GNSS means a global navigation satellite system. The V2V antenna 15, the GNSS antenna 16 and the navigation device 17 are also mounted on the subject vehicle.

The calculation unit 12 includes a microcomputer having a CPU, a ROM and a RAM. The calculation unit 12 executes a calculation process for determining or selecting an application software for supporting a driving operation of a driver of the vehicle. The application software for supporting the driving operation is defined as a support application program or a support application, which is to be executed by the application execution unit 13. The application execution unit 13 includes a microcomputer having a CPU, a ROM and a RAM. The application execution unit 13 executes various support applications such as an application 1 and an application 2.

The V2V antenna 15 is utilized for a communication (i.e., a vehicle to vehicle communication) with another vehicle RV, via a V2V antenna 25 of the other vehicle when the V2V antenna 25 is mounted on the vehicular device 21 of the other vehicle RV. The GNSS antenna 16 detects a signal output from an artificial satellite of the GNSS.

The navigation device 17 includes a memory 17A, a calculation unit 17B and a display 17C. The navigation device 17 executes a process such that the calculation unit 17B searches a route based on road map information 17E stored in the memory 17A, and the display 17C displays the searched route. The calculation unit 17B includes a microcomputer having a RAM, a ROM and a CPU. The display 17C includes a liquid crystal display panel and the like. The display 17C may include another element.

The road map information 17E according to the present embodiment shows a connection status of the road with a node as an end point of a road corresponding to a specific point of the map such as an intersection, and a link as a road unit for connecting between nodes. In the present embodiment, node data relating to the node includes at least coordinates of the node indicative of a specific point of the road such as an intersection, a merging point and a branch point, and information about an angle between links, which are connected to each other at the node. The angle between links is defined as a link connection angle. The link data relating to the link indicates a road for connecting between nodes.

(1-2. Process)

Next, a driving support process executed by the calculation unit 12 will be explained with reference to FIG. 2. The driving support process is executed by the CPU of the calculation unit 12 at predetermined intervals according to a program stored in the ROM of the calculation unit 12.

Figure 2:
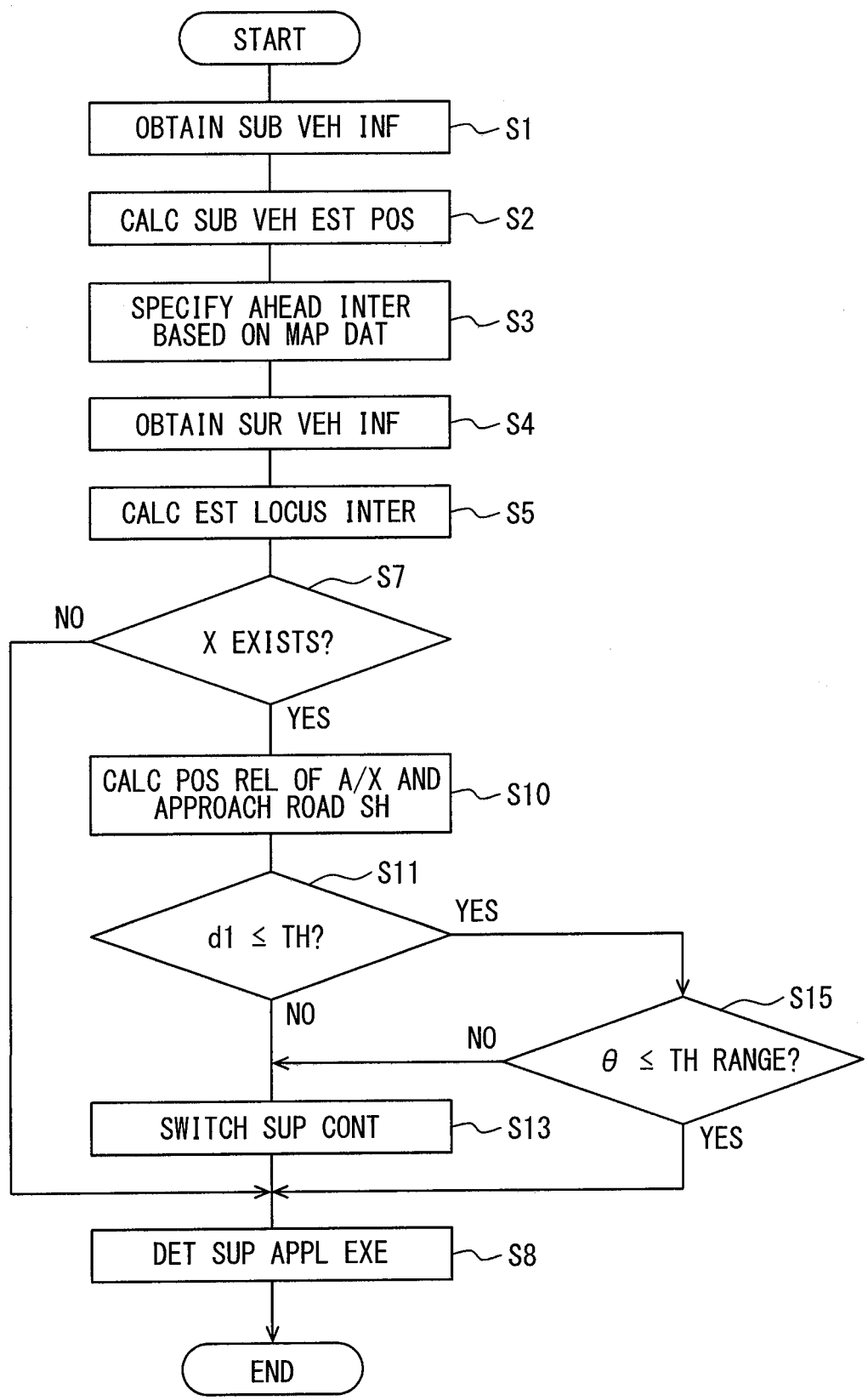
FIG. 2 is a flowchart showing a process executed by the driving support device.

As shown in FIG. 2, when the process starts, at step S1, the position of the subject vehicle HV is obtained as the subject vehicle information via the GNSS antenna 16. At step S2, the prediction position (or the estimation position) of the vehicle HV in the near future is calculated as a moving route (i.e., prediction locus) having a semi-straight line according to a change of the position obtained at step S1.

At step S3, using the road map information 17E as a map data, the ahead intersection A, which is disposed in the road ahead of the vehicle HV, is specified. Specifically, according to the position of the vehicle HV obtained at step S1, the link, on which the vehicle HV is running, on the map information 17E is specified. Further, the node of the link as an end point of the moving destination of the vehicle HV is specified as the intersection A. Here, the moving direction of the vehicle HV may be obtained according to the calculation result at step S2.

At step S4, the information about the position and the moving direction of other vehicles as surrounding vehicles is obtained from the vehicular device 21 of the other vehicle RV via the V2V antenna 15. Thus, when the information about the position and the moving direction of surrounding vehicles including the other vehicle RV is obtained, at step S5, a predicted travelling route as a prediction locus or a predicted trajectory having a semi-straight line shape of the other vehicle RV, which is predicted based on the position and the moving direction of the other vehicle, is calculated, and also, a predicted locus intersection (i.e., an estimation locus intersection) X, at which the prediction locus of the subject vehicle HV calculated at step S2 and the prediction locus of the other vehicle RV intersect with each other, is calculated. At step S7, it is determined whether the predicted locus intersection X exists. When the information about surrounding vehicles is not obtained at step S4, for example, when there is no surrounding vehicle exists around the subject vehicle HV, or when there is no intersection point between the prediction locus of the other vehicle RV and the prediction locus of the subject vehicle HV, the predicted locus intersection X does not exist. In this case, the determination at step S7 is "NO." The process proceeds to step S8.

At step S8, a support application program to be executed by the application execution unit 13 is determined. The process ends once. When the switching of the support contents is not instructed at step S13 or the like, the application 1 and the application 2, which are preliminary set by default, are determined as the support application. Thus, the application execution unit 13 executes the application 1 and the application 2 as the support application. For example, the application 1 provides warning control for avoiding a head-on collision at the intersection such as a cross road. The application 2 provides dead zone warning for detecting another vehicle RV running after the subject vehicle HV within the dead zone using a vehicle-to-vehicle communication, and informing the driver of the other vehicle RV. The application execution unit 13 executes the application 1 and the application 2 so that the warning image is displayed on the display unit 17C of the navigation device 17.

When the predicted locus intersection X exists, i.e., when the determination of step S7 is "YES," the process proceeds to step S10. At step S10, the positional relationship between the intersection A as the node and the predicted locus intersection X and the shape of the entering road to the intersection A such as a link connection angle are calculated. Next, at step S11, it is determined whether the distance d1 between the intersection A as the node and the predicted locus intersection X in a planar view is equal to or smaller than a predetermined threshold Dth.

Figure 3:
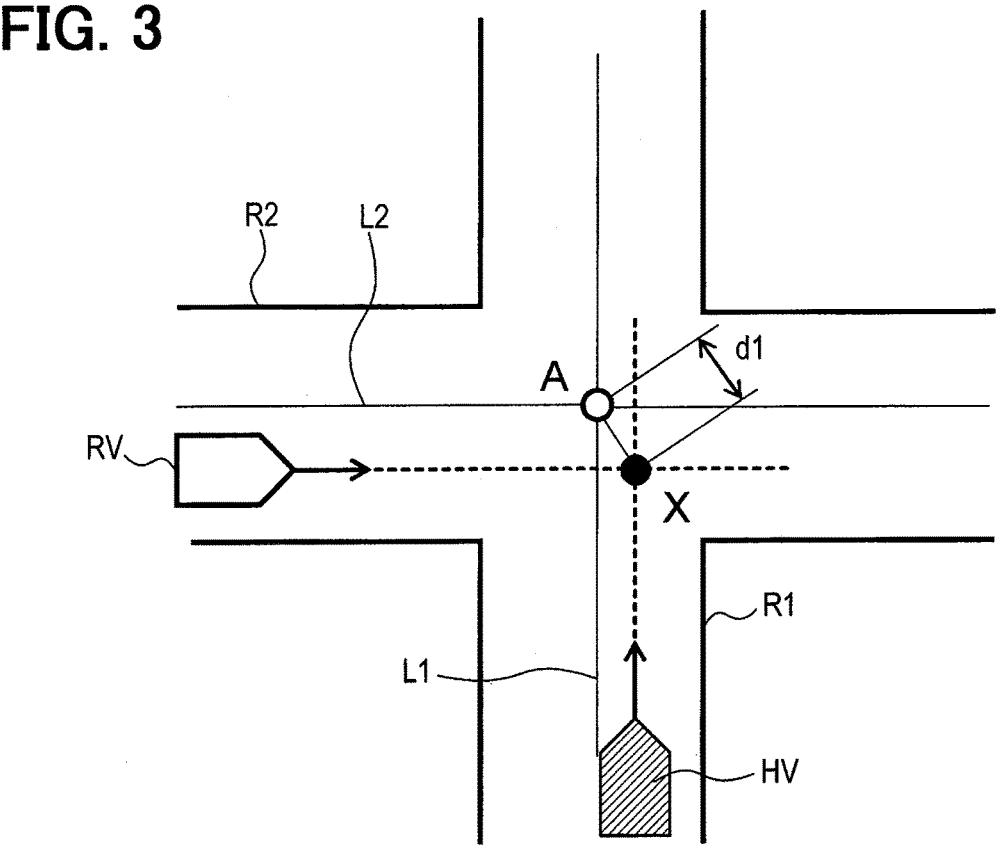
FIG. 3 is a diagram showing an explanation of the process by the driving support device.
Figure 4:
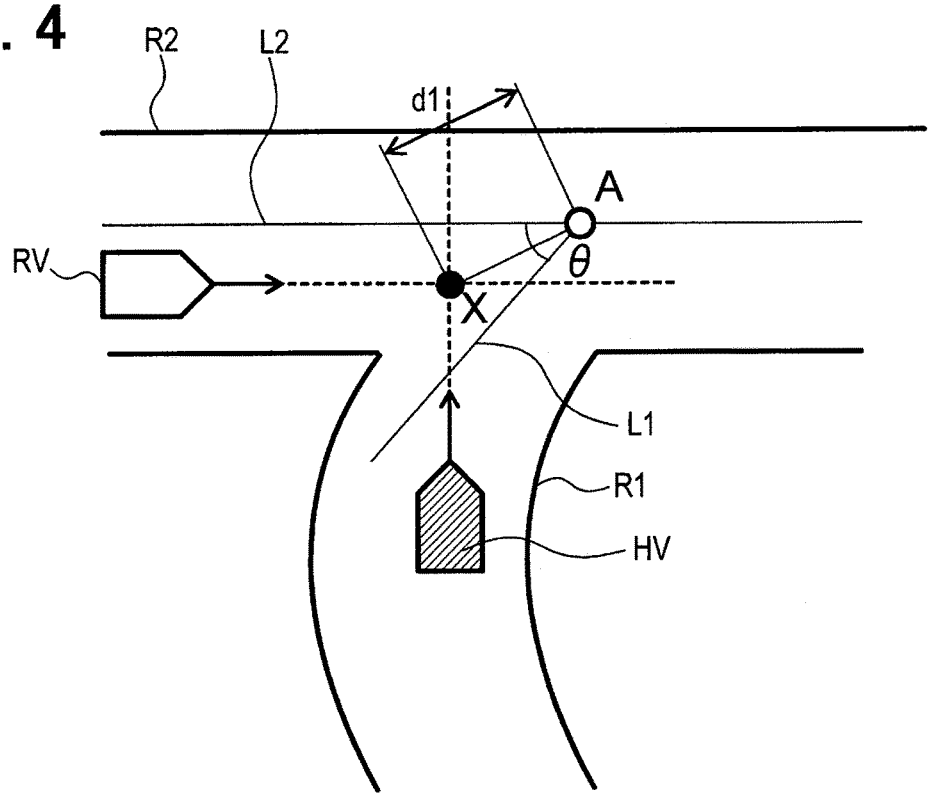
FIG. 4 is a diagram showing an explanation of another process executed by the driving support device.

For example, FIG. 3 shows an example of a case where the road R1, on which the subject vehicle HV is running, has a linear shape, the road R2, on which the other vehicle RV is running, has a linear shape, and the road R1 and the road R2 intersect with each other at the intersection of the cross road. In this case, the distance d1 between the intersection A, as the node or the intersection point between the links L1, L2 corresponding to the roads R1, R2, and the predicted locus intersection X, at which the prediction locus having the semi-linear shape of the subject vehicle HV and the prediction locus having the semi-linear shape of the other vehicle RV intersect with each other, is comparatively short. in FIG. 3, the prediction locus of the subject vehicle HV and the prediction locus of the other vehicle RV are shown as a broken line in FIG. 3. On the other hand, FIG. 4 shows a case where the road R1, on which the subject vehicle HV is running, curves and merges to the road R2, on which the other vehicle RV is running. In this case, the distance d1 between the intersection A as the node of the links L1, L2 corresponding to the roads R1, R2 and the predicted locus intersection X of the prediction loci of the subject vehicle HV and the other vehicle RV is comparatively long.

Thus, the threshold Dth is set to be longer than the distance d1 shown in FIG. 3 and shorter than the distance d1 shown in FIG. 4. In this case, when the distance d1 is longer than the threshold Dth, i.e., when the determination of step S11 is "NO," the intersection A is not the cross road. When the road map information 17E includes information about a road width or the like, the threshold Dth may be calculated based on the road width or the like in each case. At step S11, it is determined whether the distance d1 between the predicted locus intersection X and the intersection A is equal to or smaller than the threshold Dth. When the distance d1 is larger than the threshold Dth, i.e., when the determination at step S11 is "NO," it proceeds to step S13 since the intersection A is not the cross road.

At step S13, the support content is switched to a content for setting the support application to be executed to the application 2 only. Then, it goes to step S8. Then, according to the determination at step S8, the application execution unit 13 interrupts to execute the application 1, and starts to execute the application 2 only as the support application. Here, the switching operation of the support content is effective until the driving support process in FIG. 2 starts. Next, when the riving support process in FIG. 2 starts, the support content is returned to a default setting. A condition for returning to the default setting may be a condition for setting the switching operation effective within a predetermined time interval. For example, the switching operation is effective within 500 milliseconds.

On the other hand, at step S11, when the distance d1 between the predicted locus intersection X and the intersection A is equal to or smaller than the threshold Dth, i.e., when the determination of step S11 is "YES," it goes to step S15. At step S15, it is determined whether the link connection angle θ is equal to or larger than a first threshold θth1, and equal to or smaller than a second threshold θth2, i.e., whether the link connection angle θ is disposed within a predetermined threshold range. Here, the link connection angle θ is defined between −180 degrees and +180 degrees (i.e., $-180<=\theta<=+180$). When the ink connection angle θ is equal to or larger than the first threshold θth1 (e.g., 45 degrees), and equal to or smaller than the second threshold θth2 (e.g., 135 degrees), it is specified that two links intersect with each other with an angle near 90 degrees, i.e., two links provide the cross road. Thus, the ink connection angle θ is equal to or larger than the first threshold θth1, and equal to or smaller than the second threshold θ th2, i.e., when the determination of step S15 is "YES," the process proceeds to step S8. At step S8, both of the application 1 and the application 2 are executed. When the ink connection angle θ is smaller than the first threshold θ th1, or larger than the second threshold θ th2, i.e., when the determination of step S15 is "NO," the process goes to step S8 through step S13. Thus, only the application 2 is executed.

In an example of FIG. 3, when the road R1 and the road R2 intersect with each other with an overpass, there is no node as the end of the link L1 near a cross point of the links L1, L2 viewing in a two-dimensional manner. In this case, the node (i.e., the intersection A) as the end of the link L1 on a moving destination side of the subject vehicle HV is arranged at a position different from the predicted locus intersection X, so that the determination at step S11 is "NO." Then, only the application 2 is executed.

(1-3. Effects)

According to the first embodiment, following effects are obtained.

(1a) In the first embodiment, the driving support contents are determined according to the distance d1 between the intersection A and the predicted locus intersection X viewing in a planar manner. Thus, even if the amount of information obtained from the other vehicle RV is small, the driving support in accordance with a condition such as an intersection is executed. Specifically, in the present embodiment, when the position and the moving direction of the other vehicle RV are obtained, the support application corresponding to the intersection A is determined. Further, if a collision probability is calculated using only the predicted locus having a semi-linear shape of each of the other vehicle RV and the subject vehicle HV, warning error may be generated when the road R1 is curved as shown in FIG. 4, for example.

On the other hand, in the first embodiment, since the condition or the configuration such as the intersection is referred or considered, the occurrence of the warning error is restricted.

(1b) Further, at least the position and the travelling direction of the other vehicle RV are obtained. Even if the other vehicle RV cannot transmit other information, functions according to the first embodiment are obtained. Furthermore, since the size of data transmitted and received between the other vehicle RV and the subject vehicle HV is small, an electric wave is effectively utilized among society.

(1c) In the first embodiment, multiple driving support contents as the support applications having different aspects are prepared. It is determined based on the distance d1 whether each driving support content is executed. Accordingly, the driving support adapted to the conditions such as the intersection is executed, compared with a case where the support content includes only one type content.

(1d) In the first embodiment, based on the road map information 17E stored in the navigation device 17, the node (i.e., the intersection A) is specified. Further, in the first embodiment, the warning operation is performed for the driver using each support application via the display unit 17C of the navigation device 17. Accordingly, functions of the navigation device 17 are effectively utilized. Accordingly, the structure of the driving support device is simplified, and the manufacturing cost of the driving support device is reduced.

(Second Embodiment)

(2-1. Construction)

Figure 5:
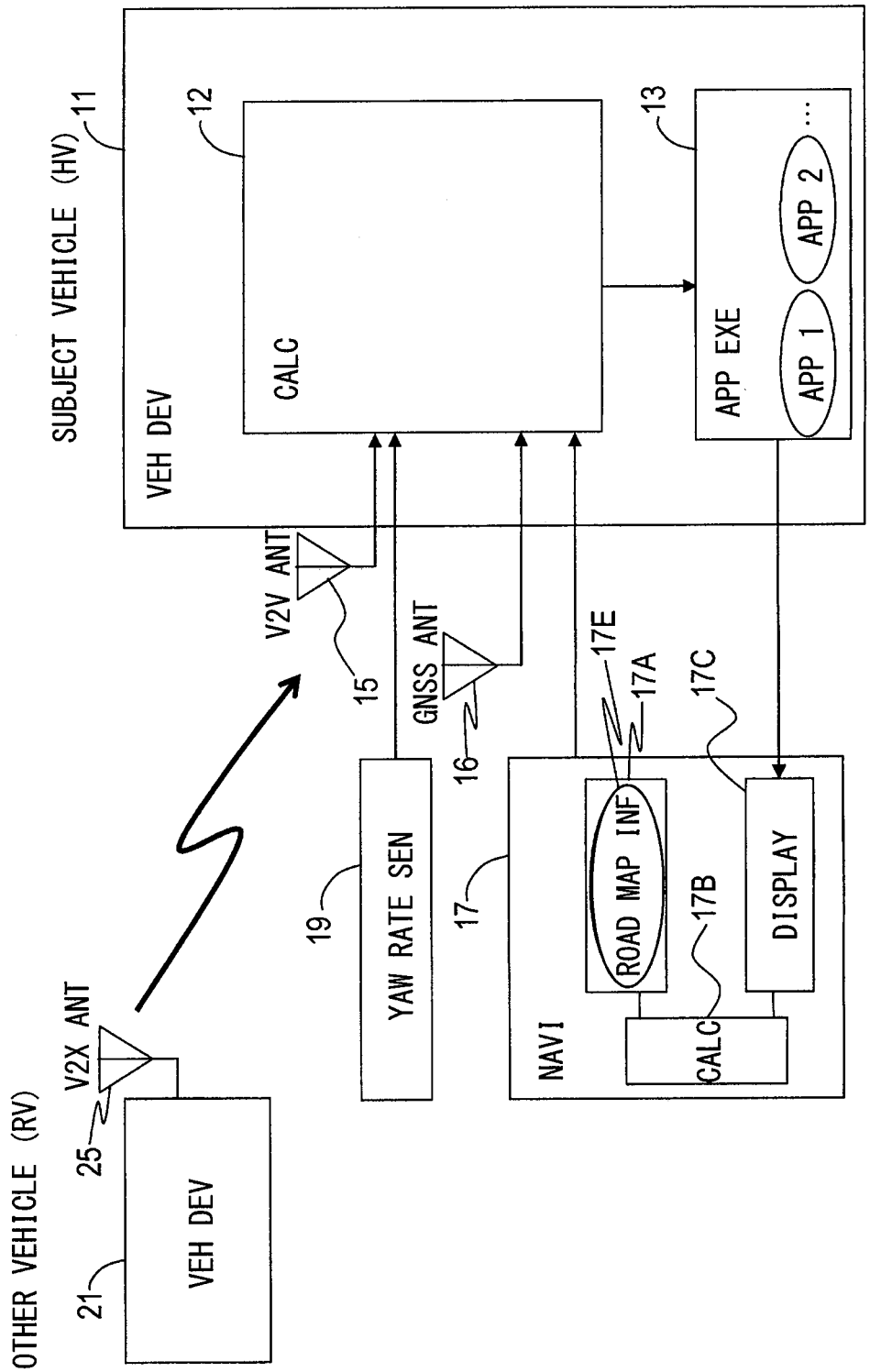
FIG. 5 is a block diagram showing a driving support device according to a second embodiment.

In the first embodiment, the predicted locus of each of the subject vehicle HV and the other vehicle RV having the semi-linear shape is calculated. In the second embodiment, the yaw rate sensor 19b for detecting a yaw rate of the subject vehicle HV is connected to the calculation unit 12, as shown in FIG. 5. The calculation unit 12 calculates the predicted locus having the semi-linear shape or the arc shape.

(2-2. Processing)

Figure 6:
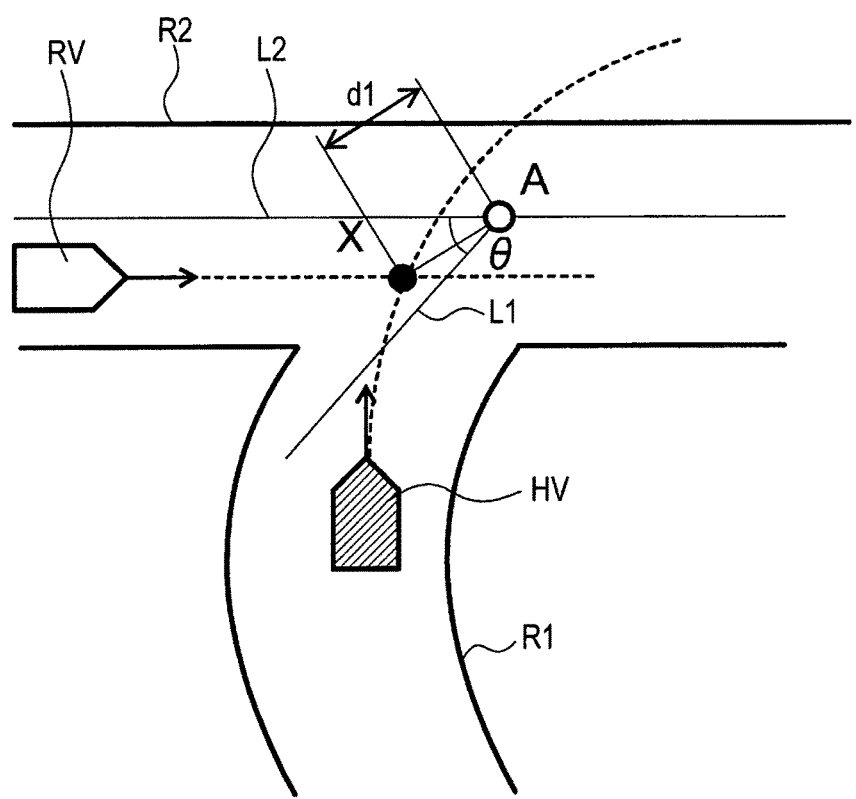
FIG. 6 is a flowchart showing an explanation of a process executed by the driving support device according to the second embodiment.

The driving support process executed by the calculation unit 12 is similar to the process according to the first embodiment in FIG. 2. Step S2 of the second embodiment is different from the first embodiment. The calculation unit 12 according to the second embodiment calculates the predicted locus of the subject vehicle HV having the semi-linear shape or the arc shape using the detection signal from the yaw rate sensor 19. For example, in the first embodiment, the predicted locus having the semi-linear shape shown as a broken line in FIG. 4 is calculated with respect to the road shape in FIG. 4. In the second embodiment, the predicted locus having the arc shape shown as a broken line in FIG. 6 is calculated. As a result, the predicted locus intersection X calculated at step S5 is also changed, as shown in FIG. 6.

In this case, the distance d1 between the intersection A and the predicted locus intersection X may be equal to or smaller than the threshold Dth.

In this case, the determination at step S11 is "NO."

When the link connection angle θ is smaller than the threshold θth1 or larger than the threshold θth2, i.e., when the determination at step S15 is "NO," only the application 2 is executed at step S13, S8.

When the curvature radius of the arc shape is calculated, the vehicle speed calculated from a position change of the subject vehicle HV may be referred in addition to the detection signal of the yaw rate sensor 19. In this case, the curvature radius of the predicted locus is more accurately calculated.

(2-3. Effects)

In the second embodiment, following effects in addition to the effects 1a to 1d in the first embodiment are obtained.

Figure 7:
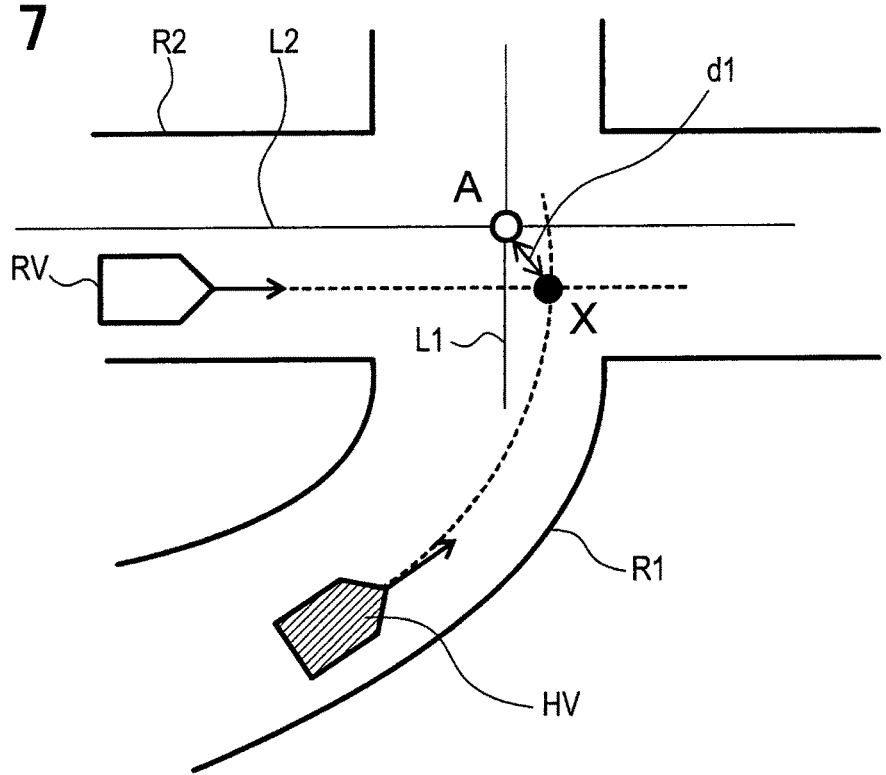
FIG. 7 is a diagram showing an explanation of another process executed by the driving support device according to the second embodiment.

(2a) In the second embodiment, even if the road R1 is curved with a complicated shape and merges or intersects with the road R2, the predicted locus intersection X is calculated with high accuracy. For example, as shown in FIG. 7, although the roads R1, R2 intersect with each other in a cross road manner almost orthogonally, the predicted locus intersection X is accurately calculated even if the road R1 is curved before the intersection A. Accordingly, in case of an example of FIG. 7, it is determined that the distance d1 between the intersection A and the predicted locus intersection X is equal to or smaller than the threshold Dth, i.e., the determination of step S11 is "YES." Further, since the link connection angle θ is equal to or larger than the threshold θth1 and equal to or smaller than the threshold θth2, i.e., when the determination at step S15 is "YES," both of the application 1 and the application 2 are executed at steps S13, S8.

Figure 8:
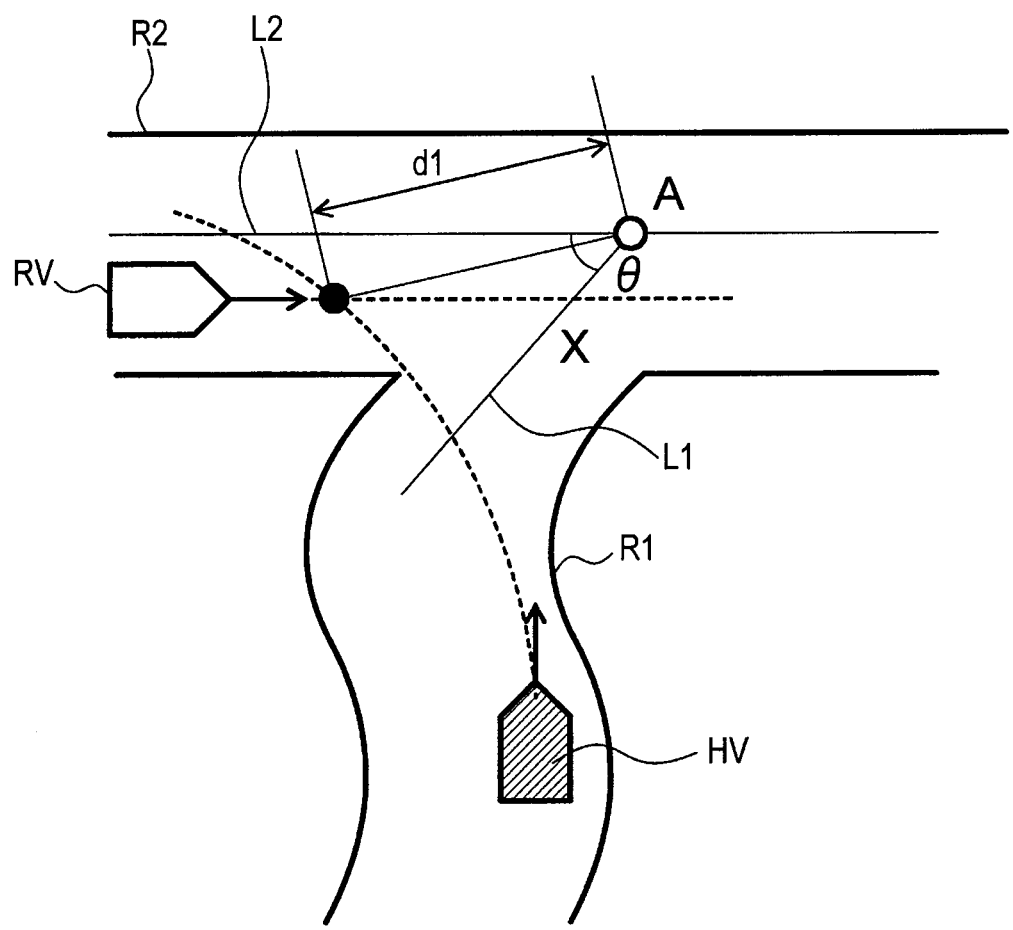
FIG. 8 is a diagram showing an explanation of further another process executed by the driving support device according to the second embodiment.

Further, as shown in FIG. 8, when the road R1 is curved in a S shape manner, and merges with the road R2, the execution of the support application is determined. As shown in FIG. 8, when the subject vehicle HV turns along the second curve viewing from the intersection A, the predicted locus intersection X is separated from the actual intersection in the locus further than the predicted locus intersection X calculated using the predicted locus having the semi-linear shape. In this case, since the distance d1 is larger than the threshold Dth, i.e., since the determination at step S11 is "NO," only the application 2 is executed at steps S13, S8.

When the subject vehicle HV turns along the first curve just before the intersection A, the predicted locus intersection X calculated at a position nearer the actual intersection in the locus. Thus, there is a timing where the distance dl is equal to or smaller than the threshold Dth, i.e., where the determination at step S11 is "YES." However, in this case, since the link connection angle θ is smaller than the threshold θth1 or larger than the threshold θth2, i.e., when the determination at step S15 is "NO," only the application 2 is executed at steps S13, S8.

Here, in each embodiment, the V2V antenna 15 corresponds to another vehicle information obtaining device, the GNSS antenna 16 and the yaw rate sensor 19 corresponds to a subject vehicle information obtaining device, the road map information 17E corresponds to a road map data, the calculation unit 12 corresponds to a route intersection point obtaining device, an end point obtaining device and a support determination device, and the application execution unit 13 corresponds to a warning device. Further, step S5 in the process of the calculation unit 12 corresponds to a route intersection obtaining device, step S3 corresponds to an end point obtaining device, and steps S8 and S13 correspond to a support determination device.

(Other Embodiments)

In each embodiment, the node as the intersection A is obtained based on the road map information 17E stored in the navigation device 17. Alternatively, the map data such as the road map information may be prepared by an independent device other than the navigation device 17.

In each embodiment, the warning to the driver is performed via the display unit 17C of the navigation device 17. Alternatively, the warning may be performed through a voice message or a sound. Alternatively, the warning may be performed by an independent device other than the navigation device 17.

In the second embodiment, the turning condition of the subject vehicle HV is obtained according to the detection signal of the yaw rate sensor 19. Alternatively, the turning condition of the subject vehicle HV may be obtained according to a steering angle detected via a steering angle sensor, a lateral acceleration detected by an acceleration sensor, or a position change of the subject vehicle HV detected by the GNSS antenna 16.

In each embodiment, the information about the position and the moving direction of the other vehicle RV is obtained via the V2V antenna 15, and the moving route having the semi-linear shape of the other vehicle RV is predicted as the predicted locus. Alternatively, the vehicle speed and/or the yaw rate of the other vehicle RV may be obtained via the V2V antenna 15 with the vehicle-to-vehicle communication, and the predicted locus of the other vehicle having the arc shape may be calculated based on this information. Alternatively, the brake operation information and/or the acceleration operation information of the other vehicle RV may be obtained via the V2V antenna 15 with the vehicle-to-vehicle communication, and this information may be used in the control in the application 1 and/or the application 2.

In each embodiment, the application 1 and the application 2 are executed as the support application. It is determined whether each of the support applications is executed. Alternatively, other support applications in addition to the application 1 and the application 2 may be executed. Alternatively, the support application may be only one type of application, and the intensity of warning may be changed in accordance with the distance d1 or the like.

In each embodiment, the support determination device may determine the driving support content to warn many times in a case where the distance d1 is smaller than a predetermined distance, compared with a case where the distance d1 is equal to or larger than the predetermined distance.

In each embodiment, when the distance d1 between the intersection A and the predicted locus intersection X is equal to or smaller than the threshold Dth, i.e., when the determination at step S11 is "YES," it is determined at step S15 whether the link connection angle θ is equal to or larger than the threshold θth1 and equal to or smaller than the threshold θth2. Alternatively, step S15 may be skipped, and when the determination at step S11 is positive, it may go to step S8.

In each embodiment, all of the other vehicle information obtaining device, the subject vehicle information obtaining device, the map data, the route intersection obtaining device, the end point obtaining device, the support determination device, and the warning device are mounted on the subject vehicle HV. Alternatively, a part of elements for executing the process in each embodiment may be performed by a cloud computing system as an external system of the subject vehicle HV. Alternatively, the map data may be obtained by the cloud computing system. In these cases, similar to the embodiments, the end point obtaining device may be provided by a node obtaining device for obtaining the node, as the end point of the link on the moving destination side of the subject vehicle which is travelling along the link, according to the map data, in which the road is shown by link units, and the position and the moving direction of the subject vehicle obtained by the subject vehicle information obtaining device.

Further, the end point obtaining device may obtain the end point based on the map data, in which the road is not shown by link units. Alternatively, the position of the end point such as an intersection may be obtained based on a road traffic sign or a road marker imaged by a vehicular camera. One function of one of elements described in each embodiment may be divided and performed by multiple elements. Alternatively, multiple functions of multiple elements in each embodiment may be merged and integrated by one element. Alternatively, a part of elements in each embodiment may be removed. Alternatively, at least a part of elements on one embodiment may be added to or replaced with elements in another embodiment.

The driving support device, a system having the driving support device, a program for functioning a computer as the driving support device, a non-transitory tangible storage medium for storing the program, a method for supporting a driving operation, and the like may be realized by the present embodiments.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving support device comprising:
    a first vehicular information obtaining device, using a microcomputer, that obtains a position and a moving direction of a first vehicle;
    a second vehicular information obtaining device, using the microcomputer, that obtains a position and a moving direction of a second vehicle via a wireless communication with the second vehicle;
    a route intersection obtaining device, using the microcomputer, that obtains an intersection between a predicted moving route of the first vehicle, which is calculated based on the position and the moving direction of the first vehicle, and a predicted moving route of the second vehicle, which is calculated based on the position and the moving direction of the second vehicle;
    an end point obtaining device, using the microcomputer, that obtains an end point of a unit road on a moving destination side of the first vehicle while travelling along the unit road, according to the position and the moving direction of the first vehicle;
    a support determining device, using the microcomputer, that determines a driving support content for a driver of the first vehicle, according to a distance between the intersection and the end point; and
    a warning device, using the microcomputer, that warns the driver of the first vehicle according to the driving support content,
    wherein the distance is changed based on a feature of the end point.

2. The driving support device according to claim 1,
    wherein the first vehicular information obtaining device further obtains a turning condition of the first vehicle,
    wherein the predicted moving route of the first vehicle is calculated based on the position, the moving direction and the turning condition of the first vehicle, and the predicted moving route of the first vehicle has a semi-linear shape or an arc shape,
    wherein the predicted moving route of the second vehicle is calculated based on the position and the moving direction of the second vehicle, and the predicted moving route of the second vehicle has a semi-linear shape, and
    wherein the route intersection obtaining device obtains the intersection between the predicted moving route of the first vehicle having the semi-linear shape or the arc shape and the predicted moving route of the second vehicle having the semi-linear shape.

3. The driving support device according to claim 2,
    wherein the first vehicular information obtaining device obtains the turning condition of the first vehicle based on a yaw rate and a vehicle speed of the first vehicle.

4. The driving support device according to claim 1,
    wherein the support determining device determines the driving support content according to the distance and a connection angle at the end point between the unit road and another unit road, and
    wherein the another unit road is connected to the unit road at the end point.

5. The driving support device according to claim 1,
    wherein the driving support content includes a plurality of driving support operations, each of which is different from each other, and
    wherein the support determining device determines whether each driving support operation is executed.

6. The driving support device according to claim 1,
    wherein the end point obtaining device obtains the end point based on map data stored in a navigation device.

7. The driving support device according to claim 1,
    wherein the warning device warns the driver using a display of a navigation device.

8. The driving support device according to claim 1,
    wherein a road is divided into a plurality of unit roads, and
    wherein the first vehicular information obtaining device, the second vehicular information obtaining device, the route intersection obtaining device, the end point obtaining device, the support determining device and the warning device are mounted on the first vehicle.

9. A method for supporting a driving operation of a driver comprising:
    obtaining a position and a moving direction of a first vehicle;
    obtaining a position and a moving direction of a second vehicle via a wireless communication with the second vehicle;
    obtaining an intersection between a predicted moving route of the first vehicle, which is calculated based on the position and the moving direction of the first vehicle, and a predicted moving route of the second vehicle, which is calculated based on the position and the moving direction of the second vehicle;
    obtaining an end point of a unit road on a moving destination side of the first vehicle while travelling along the unit road, according to the position and the moving direction of the first vehicle;
    determining a driving support content for a driver of the first vehicle, according to a distance between the intersection and the end point, wherein the distance is changed based on a feature of the end point; and warning the driver of the first vehicle according to the driving support content.

10. The method according to claim 9,
wherein obtaining the position and the moving direction of a first vehicle further comprises obtaining a turning condition of the first vehicle,
wherein the predicted moving route of the first vehicle is calculated based on the position, the moving direction and the turning condition of the first vehicle, and the predicted moving route of the first vehicle has a semi-linear shape or an arc shape,
wherein the predicted moving route of the second vehicle is calculated based on the position and the moving direction of the second vehicle, and the predicted moving route of the second vehicle has a semi-linear shape, and
wherein obtaining the intersection between a predicted moving route of the first vehicle further comprises obtaining the intersection between the predicted moving route of the first vehicle having the semi-linear shape or the arc shape and the predicted moving route of the second vehicle having the semi-linear shape.

11. The method according to claim 10,
wherein obtaining the position and the moving direction of the first vehicle further comprises obtaining the turning condition of the first vehicle based on a yaw rate and a vehicle speed of the first vehicle.

12. The method according to claim 9,
wherein determining the driving support content for the driver of the first vehicle further comprises determining the driving support content according to the distance and a connection angle at the end point between the unit road and another unit road, and
wherein the another unit road is connected to the unit road at the end point.

13. The method according to claim 9,
wherein the driving support content includes a plurality of driving support operations, each of which is different from each other, and
wherein determining the driving support content for the driver of the first vehicle further comprises determining whether each driving support operation is executed.

14. The method according to claim 9,
wherein obtaining the end point of a unit road further comprises obtaining the end point based on map data stored in a navigation device.

15. The method according to claim 9,
wherein warning the driver of the first vehicle further comprises warning the driver using a display of a navigation device.

16. A system for supporting a driving operation of a driver comprising:
a central processor;
a computer-readable storage medium; and
a set of computer-executable instructions stored on the computer-readable storage medium that cause the central processor to:
obtain a position and a moving direction of a first vehicle;
obtain a position and a moving direction of a second vehicle via a wireless communication with the second vehicle;
obtain an intersection between a predicted moving route of the first vehicle, which is calculated based on the position and the moving direction of the first vehicle, and a predicted moving route of the second vehicle, which is calculated based on the position and the moving direction of the second vehicle;
obtain an end point of a unit road on a moving destination side of the first vehicle while travelling along the unit road, according to the position and the moving direction of the first vehicle;
determine a driving support content for a driver of the first vehicle, according to a distance between the intersection and the end point, wherein the distance is changed based on a feature of the end point; and
warn the driver of the first vehicle according to the driving support content.

17. The system according to claim 16,
wherein the set of computer-executable instructions stored on the computer-readable storage medium further cause the central processor to:
obtain a turning condition of the first vehicle,
wherein the predicted moving route of the first vehicle is calculated based on the position, the moving direction and the turning condition of the first vehicle, and the predicted moving route of the first vehicle has a semi-linear shape or an arc shape,
wherein the predicted moving route of the second vehicle is calculated based on the position and the moving direction of the second vehicle, and the predicted moving route of the second vehicle has a semi-linear shape, and
wherein obtaining the intersection between the predicted moving route of the first vehicle further comprises obtaining the intersection between the predicted moving route of the first vehicle having the semi-linear shape or the arc shape and the predicted moving route of the second vehicle having the semi-linear shape.

18. The system according to claim 17,
wherein the turning condition of the first vehicle is determined based on a yaw rate and a vehicle speed of the first vehicle.

19. The system according to claim 16,
wherein the driving support is determined according to the distance and a connection angle at the end point between the unit road and another unit road, and
wherein the another unit road is connected to the unit road at the end point.

20. The system according to claim 16,
wherein the driving support content includes a plurality of driving support operations, each of which is different from each other, and
wherein the set of computer-executable instructions stored on the computer-readable storage medium further cause the central processor to:
determine whether each driving support operation is executed.

* * * * *